Nov. 1, 1932.                W. C. LAUGHLIN                1,885,735
                          CENTRIPETAL SEPARATOR
                          Filed June 16, 1930            2 Sheets-Sheet 1
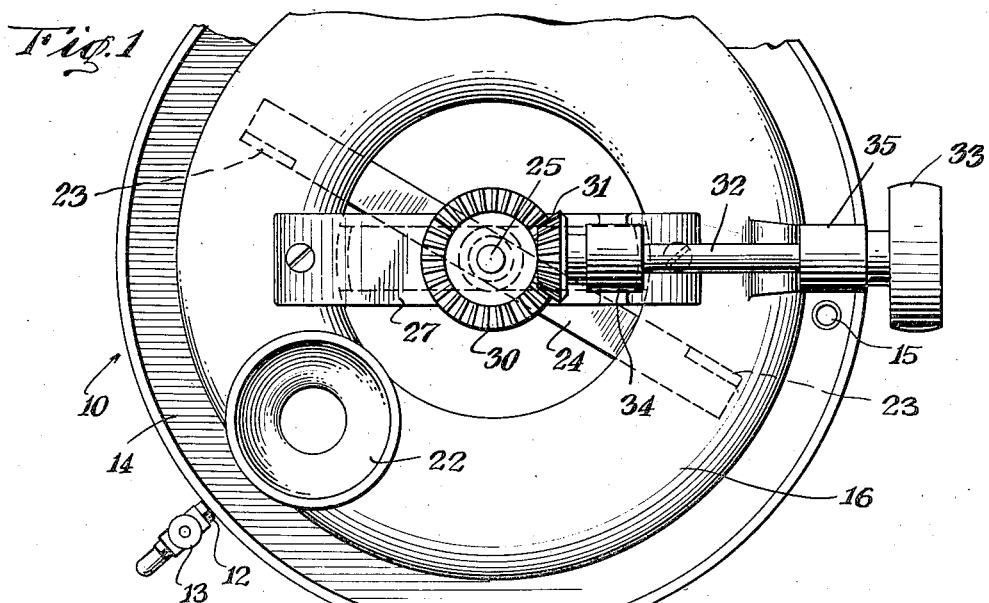
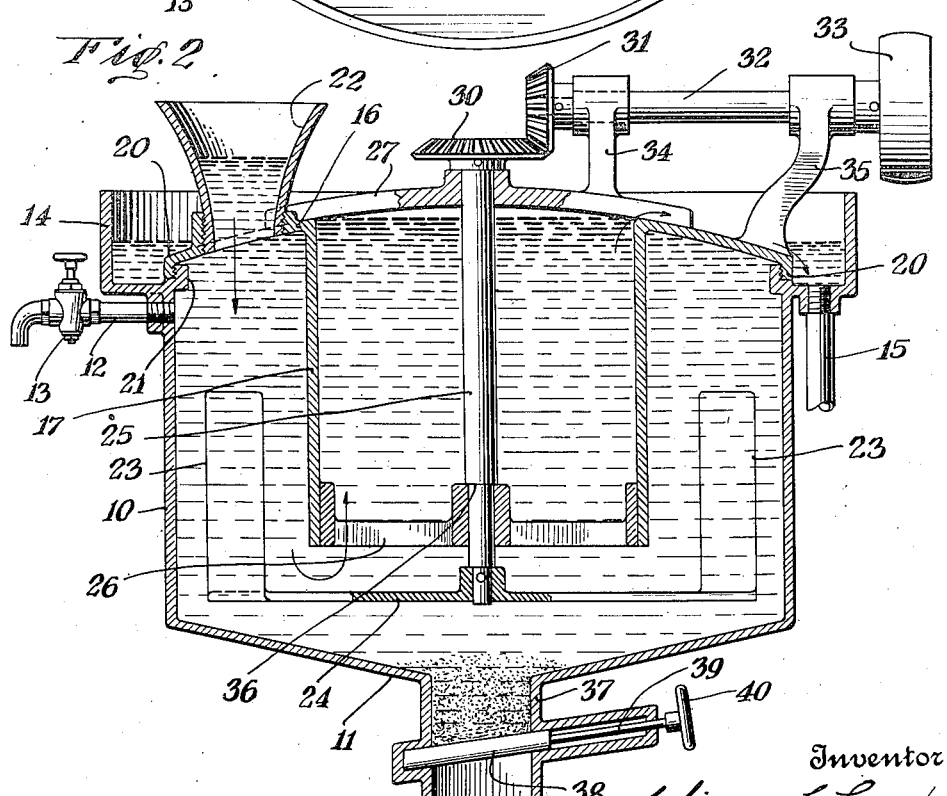
Inventor
William C. Laughlin
By Attorney
Albert M. Austin Nov. 1, 1932.  W. C. LAUGHLIN  1,885,735
CENTRIPETAL SEPARATOR
Filed June 16, 1930   2 Sheets-Sheet 2
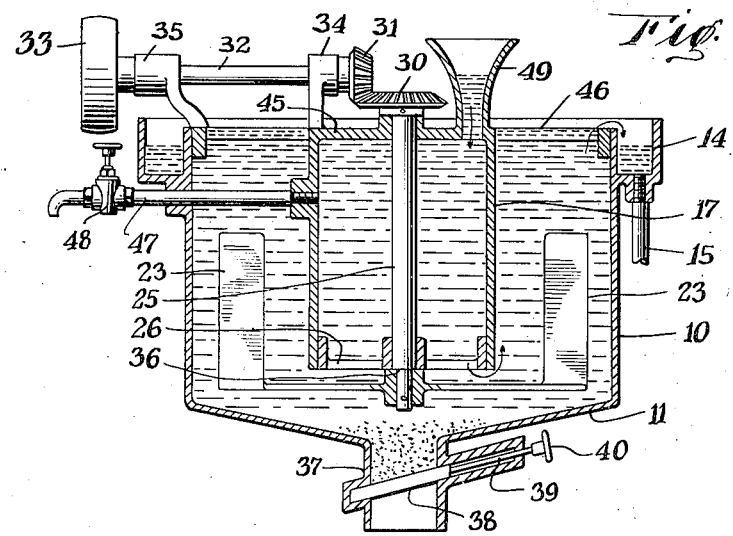
Fig. 3
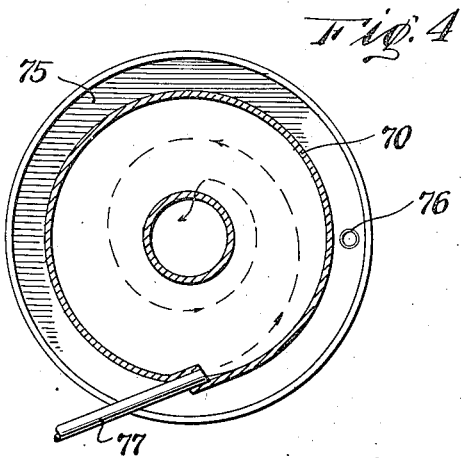
Fig. 4
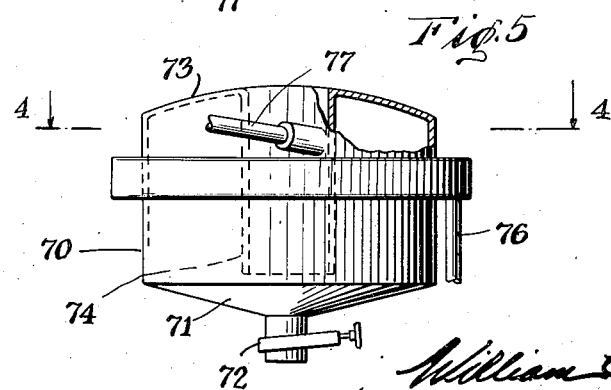
Fig. 5
Inventor
William C. Laughlin
By his Attorney
Albert M. Austin Patented Nov. 1, 1932

1,885,735

UNITED STATES PATENT OFFICE

WILLIAM C. LAUGHLIN, OF GLENDALE, CALIFORNIA, ASSIGNOR TO THE L. A. B. COMPANY, OF NEW YORK, N. Y., A CORPORATION OF NEW YORK

CENTRIPETAL SEPARATOR

Application filed June 16, 1930. Serial No. 461,380.

This invention relates to separators, and more particularly to a device and means for separating solids of different specific gravities when contained in a liquid medium. The invention is particularly applicable to suspensions of pulp in water and provides for the separation and removal of floating material and of heavy particles such as sand and dirt therefrom without disturbing the condition of the suspension.

In treating pulp, as, for example, in paper mills, it is necessary to remove oversize and foreign particles from the pulp suspension to avoid contamination of the product. This separation must be accomplished in such a way that the suspension of the pulp itself is not destroyed.

This is accomplished in accordance with the present invention by providing a tank in which a slow rotary motion is imparted to the pulp suspension. A considerable increase in area is afforded for the suspension so that the liquid feed is spread out over the area of the tank, and permits the heavier particles to readily settle, and by the centripetal force, bring said particles to a suitable central hopper. The lighter impurities which float upon the surface of the liquid may be removed at intervals to prevent them from accumulating and interfering with the efficient operation of the tank. The slow rotary motion of the liquid causes the solid particles to move toward and accumulate at the center of the tank; hence the device will be referred to as a centripetal separator.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a plan view of a separator constructed in accordance with the present invention;

Fig. 2 is a section taken on the line 2—2 of Fig. 1;

Fig. 3 is a vertical section of a modified form of separator;

Fig. 4 is a plan view of a further modified form of separator; and

Fig. 5 is a side elevation thereof.

Like reference characters denote like parts in the several figures of the drawings.

In the following description and in the claims parts will be identified by specific names for convenience, but they are intended to be as generic in their application to similar parts as the art will permit.

Referring to the drawings more in detail, the form of the invention illustrated in Figs. 1 and 2 comprises a tank 10 which may be of any suitable size, dependent upon the quantity of material to be treated. Said tank is of cylindrical form and is provided with a hopper 11 in which the solid particles are collected. A discharge pipe 12 is inserted in the wall of said tank adjacent the top thereof and is provided with a valve 13 for the purpose to be described. A weir 14 is also formed about the top of said tank and communicates with a discharge pipe 15.

A cover 16, provided with a central cylindrical baffle 17, is secured over the top of tank 10 in any convenient manner, as by flange 20 which is in threaded engagement with flange 21 formed on tank 10. It is obvious that this form of support is illustrative only and may be modified to suit the requirements of the particular installation.

An inlet spout 22 is formed in cover 16 in a position to apply liquid to the tank between the outer wall thereof and baffle 17. A stirring device comprising a pair of paddles 23 carried on frame 24 is pinned to shaft 25 which is journaled in spiders 26 and 27 which are mounted on baffle 17 and top 16, respectively. Said shaft is provided with a beveled gear 30 cooperating with a second beveled gear 31 which is mounted on shaft 32 and driven from pulley 33 by any convenient source of power. A pair of bearing members 34 and 35 are mounted on the top 16 and serve to support shaft 32 in the desired position. Shoulder 36 of shaft 25 forms a thrust bearing for preventing vertical movement of said shaft.

Hopper 11 communicates with a discharge spout 37 having a sliding valve 38 formed therein to control the discharge of material. Said valve may be operated by any suitable mechanism such as rod 39 and handwheel 40 which cooperates therewith. The particular mechanical construction is shown merely by way of illustration. It is to be understood that the various details, such as the form and shape of the apparatus and the supports for the rotating members, may be varied in a manner which will be readily apparent to any person skilled in the art.

In the operation of the above described device the liquid containing solids in suspension, as, for example, paper pulp in water suspension, is applied to spout 22 and passes downwardly between baffle 17 and the wall of tank 10 and thence upwardly within baffle 17 and is discharged over top 16 into weir 14. A slow rotational movement is imparted to the liquid in tank 10 by paddles 23 to which power is applied through the mechanism above described. This movement causes the higher gravity sediment, such as sand and dirt to move toward the center and fall out of the liquid and to be collected in spout 37 from which it may be removed as desired by suitable operation of valve 38. The slow current flow of the fluid is sufficient to maintain the pulp in suspension while the sand and other particles settle out but must not be sufficient to set up centrifugal action and throw the sediment to the periphery of the tank.

It is to be noted that valve 38 is mounted at an angle to the horizontal so that the sediment will tend to accumulate in the lower portion thereof. The greater portion of the sediment can thus be removed by a slight opening of the valve which will prevent substantial discharge of the liquid under treatment.

As the operation is continued, floating particles and lighter impurities, such as grease, will accumulate at the top of tank 10. They may be removed as desired through pipe 12 by suitable operation of valve 13 or by scraping off top of liquid. The pulp suspension flows over top 16 into weir 14 and may be removed through pipe 15 in a substantially clean condition.

In the form of the invention shown in Fig. 3, the various elements corresponding to those shown in Fig. 2 are given similar reference numerals. In this form, however, cover 45 is applied to the central portion of the tank and is supported by suitable spider 46. Baffle 17 is mounted on cover 45 and supports paddles 23 and the driving mechanism in the manner above described. A discharge pipe 47 having a valve 48 is applied to baffle 17 for removing the floating material from the top of the liquid contained therein. Supply spout 49 is formed in cover 45 in a position to apply liquid to the center of the tank within baffle 17. In this form of the invention the liquid which is applied within baffle 17, passes downwardly under said baffle and thence upwardly around the sides of the tank over which it flows into weir 14. The operation of this form of the invention is similar to that of the form illustrated in Figs. 1 and 2, with the exception that the current flow is reversed and extends from the center of the tank to the periphery thereof.

In the modified form of the invention shown in Figs. 4 and 5, a tank 70 is provided with a hopper 71 having a valve 72 associated therewith which is similar in construction to tank 10, hopper 11 and valve 38 of Fig. 2. A cover 73 is secured to tank 70 and carries downwardly extending central baffle 74. Overflow weir 75 is located around tank 10 and communicates with pipe 76. An inlet pipe 77 is inserted in tank 70 in a position to apply liquid in a substantially tangential direction thereto. The liquid pressure may be such that a slow rotational movement is imparted to the liquid within tank 70 similar to that imparted by paddles 23 to the liquid within tank 10. The heavy particles are accordingly deposited in hopper 71 while the liquid passes under baffle 74 and flows over top 73 into weir 75.

In the cleaning apparatus above described, it is preferable to maintain the rate of movement of the liquid within the tank comparatively slow in order to prevent the heavy particles from being thrown to the periphery of the tank due to centrifugal action. The apparatus may be operated substantially continuously and serves to remove both the heavy particles and the light floating material from the suspension without interfering with the suspension itself. It is particularly applicable to paper pulp, but it is obvious that it may be used for other liquids, as, for example, clay, coal or graphite suspensions. These and other uses will be readily apparent to persons skilled in the art. The slow current flow maintains the pulp in suspension and allows the heavier material to fall to the bottom of the tank and the centripetal force exerted by the slowly rotating liquid moves the settlings to the center of the tank and deposits them in the hopper.

While certain novel features of the invention have been shown and described and are pointed out in the annexed claims, it will be understood that various omissions, substitutions and changes in the forms and details of the device illustrated and in its operations may be made by those skilled in the art without departing from the spirit of the invention.

What is claimed is:

1. The process of cleaning a suspension which comprises applying said suspension to a tank and causing the same to flow downwardly and thence upwardly in said tank, causing slow rotary movement of said suspension whereby the heavy particles are discharged centrally thereof, and removing the floating particles from the top of said suspension prior to said downward passage.

2. A cleaning apparatus comprising a substantially circular tank having a stationary cylindrical baffle mounted coaxially thereof and extending downwardly therein, rotating members mounted between said tank and said baffle for causing slow rotational movement of the material therein and a central hopper having a discharge valve at the bottom of said tank, said valve being adapted to permit removal of solid particles and substantially prevent removal of liquid therefrom.

3. A cleaning apparatus comprising a tank, a downwardly extending stationary baffle mounted therein, rotating members positioned between said tank and said baffle for causing rotational movement of the contents of said tank, means for introducing liquid between said tank and said baffle, and means for discharging the liquid which has passed under said baffle into the central portion of said tank.

4. A cleaning apparatus comprising a circular tank, a stationary cylindrical baffle mounted axially thereof, a closure extending between said baffle and said tank, an inlet spout in said closure, an overflow weir surrounding said tank and adapted to receive liquid which has flowed from within said baffle and over said closure, and a rotating member mounted within said tank and extending between said baffle and said tank causing rotary movement of the liquid therein.

5. A device for treating liquids comprising a tank, a cover for a portion of said tank, a stationary downwardly extending baffle secured thereto, a rotating member mounted on said cover, said member having paddles extending between said tank and said baffle and means for causing rotation thereof.

In testimony whereof I have hereunto set my hand.

WILLIAM C. LAUGHLIN.